United States Patent
Kumano et al.

(10) Patent No.: US 10,161,524 B2
(45) Date of Patent: Dec. 25, 2018

(54) AUSTENITIC STAINLESS STEEL SHEET FOR GASKET, AND GASKET

(71) Applicant: NISSHIN STEEL CO., LTD., Tokyo (JP)

(72) Inventors: Naohito Kumano, Yamaguchi (JP); Kazunari Imakawa, Yamaguchi (JP); Manabu Oku, Yamaguchi (JP)

(73) Assignee: NISSHIN STEEL CO., LTD., Tokyo (JE)

( * ) Notice: Subject to any disclaimer, the term of this patent is extended or adjusted under 35 U.S.C. 154(b) by 0 days.

(21) Appl. No.: 15/129,453

(22) PCT Filed: Mar. 16, 2015

(86) PCT No.: PCT/JP2015/057623
§ 371 (c)(1),
(2) Date: Sep. 27, 2016

(87) PCT Pub. No.: WO2015/151771
PCT Pub. Date: Oct. 8, 2015

(65) Prior Publication Data
US 2017/0184200 A1 Jun. 29, 2017

(30) Foreign Application Priority Data
Apr. 2, 2014 (JP) .................................. 2014-076264

(51) Int. Cl.
*F16J 15/08* (2006.01)
*C22C 38/00* (2006.01)
(Continued)

(52) U.S. Cl.
CPC .......... *F16J 15/0818* (2013.01); *C21D 6/004* (2013.01); *C21D 9/46* (2013.01); *C22C 38/00* (2013.01);
(Continued)

(58) Field of Classification Search
CPC .... F16J 15/0818; F16J 15/0806; C21D 6/004; C21D 9/46; C21D 2211/001;
(Continued)

(56) References Cited

U.S. PATENT DOCUMENTS 3,542,380 A * 11/1970 Klein ................... F16J 15/0887
277/639
4,306,172 A * 12/1981 Matsukura .............. H01J 9/142
148/651
(Continued)

FOREIGN PATENT DOCUMENTS

| JP | 07-003406 | 1/1995 |
| JP | 07-003407 | 1/1995 |

(Continued)

*Primary Examiner* — Nathan Cumar
(74) *Attorney, Agent, or Firm* — Clark & Brody

(57) ABSTRACT

To provide a heat resistant metal gasket that is controlled to have a strength level (ordinary temperature hardness) capable of facilitating processing, and has excellent gas leak resistance.

An austenitic stainless steel sheet for a metal gasket, having a chemical composition containing from 0.015 to 0.200% of C, from 1.50 to 5.00% of Si, from 0.30 to 2.50% of Mn, from 7.0 to 17.0% of Ni, from 13.0 to 23.0% of Cr, and from 0.005 to 0.250% of N, all in terms of percentage by mass, containing, as necessary, at least one of Mo, Cu, Nb, Ti, V, Zr, W, Co, B, Al, REM (rare-earth element except for Y), Y, Ca and Mg, with the balance of Fe and unavoidable impurities, having an ordinary temperature hardness of 430 HV or less, having a half width of a peak of an austenite crystal (311) plane in an X-ray diffraction pattern of a cross section perpendicular to a sheet thickness direction of from 0.10 to 1.60°, and having a surface roughness Ra of 0.30 μmm or less.

8 Claims, 1 Drawing Sheet

(51) Int. Cl.
*C22C 38/58* (2006.01)
*C21D 6/00* (2006.01)
*C21D 9/46* (2006.01)
*C22C 38/02* (2006.01)
*C22C 38/04* (2006.01)
*C22C 38/06* (2006.01)
*C22C 38/42* (2006.01)
*C22C 38/44* (2006.01)
*C22C 38/46* (2006.01)
*C22C 38/48* (2006.01)
*C22C 38/50* (2006.01)
*C22C 38/52* (2006.01)
*C22C 38/54* (2006.01)

(52) U.S. Cl.
CPC .......... *C22C 38/001* (2013.01); *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *F16J 15/0806* (2013.01); *C21D 2201/01* (2013.01); *C21D 2201/04* (2013.01); *C21D 2211/001* (2013.01)

(58) Field of Classification Search
CPC .......... C21D 2201/001; C21D 2201/01; C21D 2201/04; C22C 38/001; C22C 38/005; C22C 38/02; C22C 38/04; C22C 38/06; C22C 38/42; C22C 38/44; C22C 38/46; C22C 38/48; C22C 38/50; C22C 38/52; C22C 38/54; C22C 38/00; C22C 38/58

USPC ....................................................... 277/591
See application file for complete search history.

(56) References Cited

U.S. PATENT DOCUMENTS

| | | | | |
|---|---|---|---|---|
| 5,987,088 A | * | 11/1999 | Aono | C21D 6/004 148/326 |
| 6,338,762 B1 | * | 1/2002 | Sato | C21D 6/004 148/325 |
| 6,502,833 B1 | * | 1/2003 | Shibata | F16J 15/0887 277/647 |
| 2005/0057004 A1 | * | 3/2005 | Yamazaki | C23C 28/00 277/592 |
| 2007/0062909 A1 | * | 3/2007 | Crockett | C22C 19/055 216/84 |
| 2008/0047636 A1 | * | 2/2008 | Sasaki | C21D 6/002 148/559 |
| 2009/0077801 A1 | * | 3/2009 | Scarlin | C21D 7/06 29/889.7 |
| 2010/0170597 A1 | * | 7/2010 | Zurfluh | C21D 6/001 148/608 |

FOREIGN PATENT DOCUMENTS

| | | | |
|---|---|---|---|
| JP | 07-278758 | | 10/1995 |
| JP | 09-279315 | | 10/1997 |
| JP | 11-241145 | | 9/1999 |
| JP | 2001-059141 | * | 3/2001 |
| JP | 2003-082441 | | 3/2003 |
| JP | 2008-111192 | | 5/2008 |
| JP | 2011-252208 | | 12/2011 |
| JP | 2014-189863 | | 10/2014 |

\* cited by examiner

[Fig.1]
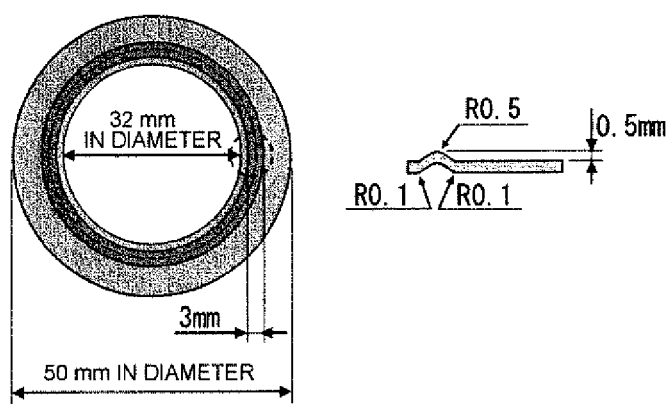
[Fig.2]
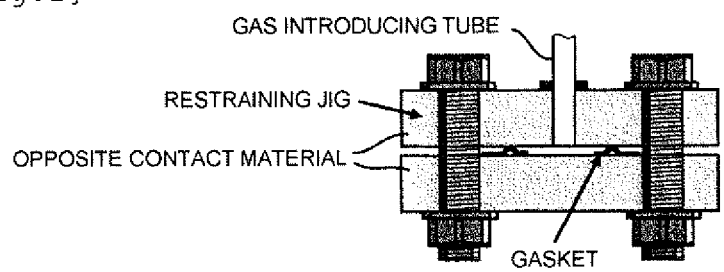

AUSTENITIC STAINLESS STEEL SHEET FOR GASKET, AND GASKET

TECHNICAL FIELD

The present invention relates to an austenitic stainless steel sheet for a heat resistant metal gasket that is suitable for gas seal of a member exposed to a high temperature, such as an internal combustion engine, an exhaust gas flow path member (e.g., an exhaust manifold and a catalyst converter), an injector, an EGR cooler, and a turbo charger, and a metal gasket using the same as a material.

BACKGROUND ART

In recent years, there is an increasing need of a gasket that is exposed to a temperature of from 600 to 800° C., but the following problems are involved. An SUS301 or SUS431 series material represented by those described in PTLs 1, 2, and 3 undergoes significant softening since the heating temperature is close to the decomposition temperature of the martensite phase, and thus is inferior in settling resistance. A precipitation strengthened material, such as NCF 625 and NCF 718 defined in JIS G4902 (corrosion-resisting and heat-resisting superalloy plates and sheets) and SUH660 defined in JIS G4312 (heat-resisting steel plate), is effective for precipitation strengthening at a temperature of from 600 to 800° C., but the cost thereof is increased due to expensive Ni contained in a large amount. PTLs 4, 5, 6, and 7 describe an Fe—Cr—Mn—Ni austenitic stainless steel strengthened by Ni, which is being applied to a part of heat resistant gaskets.

The aforementioned steel species have been studied for further enhancing the high strength thereof, assuming the use thereof in a high temperature range. However, in the case where a large amount of a martensite phase is contained, and in the case where the N content is large, the yield stress (0.2% offset yield strength) is significantly increased. Furthermore, a material that has been increased in strength by cold rolling finishing (which is hereinafter referred to as an "HT material") is generally applied to a gasket, and thus the gasket suffers surface roughening on forming, and suffers necking at a bent part in the case where the ductility thereof is insufficient. These surface property and defects in the processed shape become a factor of considerable deterioration in gas sealing capability.

CITATION LIST

Patent Literatures

PTL 1: JP-A-7-3406
PTL 2: JP-A-2008-111192
PTL 3: JP-A-7-278758
PTL 4: JP-A-2003-82441
PTL 5: JP-A-7-3407
PTL 6: JP-A-9-279315
PTL 7: JP-A-11-241145

SUMMARY OF INVENTION

Technical Problem

The aforementioned examples having been described do not necessarily perform a component design that sufficiently considering prevention of gas leakage due to forming, and the retention of heat resistance and corrosion resistance in use.

The invention is to provide a heat resistant metal gasket that is controlled to have a strength level (ordinary temperature hardness) capable of facilitating processing, and has excellent gas leak resistance.

Solution to Problem

For achieving the objects, the invention provides an austenitic stainless steel sheet for a metal gasket, having a chemical composition containing from 0.015 to 0.200% of C, from 1.50 to 5.00% of Si, from 0.30 to 2.50% of Mn, from 7.0 to 17.0% of Ni, from 13.0 to 23.0% of Cr, and from 0.005 to 0.250% of N, all in terms of percentage by mass, with the balance of Fe and unavoidable impurities, having an ordinary temperature hardness of 430 NV or less, having a half width of a peak of an austenite crystal (311) plane in an X-ray diffraction pattern of across section perpendicular to a sheet thickness direction of from 0.10 to 1.60°, and having a surface roughness Ra of 0.30 μm or less.

The chemical composition of the steel sheet may further contain, as an arbitrary additional element, at least one of 2.00% or less of Mo, 4.00% or less of Cu, 0.80% or less of Nb, 0.50% or less of Ti, 1.00% or less of V, 1.00% or less of Zr, 3.00% or less of W, 3.00% or less of Co, and 0.020% or less of B, all in terms of percentage by mass. The chemical composition may also further contain, as an arbitrary additional element, at least one of 0.20% or less of Al, 0.20% or less of REM (i.e., rare-earth element except for Y), 0.20% or less of Y, 0.10% or less of Ca, and 0.10% or less of Mg, all in terms of percentage by mass.

The steel sheet may have a sheet thickness of, for example, from 0.10 to 0.40 mm, which may be in a range of from 0.15 to 0.30 mm. The steel sheet that is more preferred may have a difference ΔHV between an ordinary temperature hardness and a high temperature hardness at 700° C. of 300 HV or less.

The invention also provides a metal gasket containing the steel sheet having been formed, the metal gasket having a bead formed by press forming, and being used by pressing an apex of the bead onto an opposite contact material. The use temperature thereof is, for example, from 600 to 800° C. The gasket maybe used for sealing a combustion gas of an internal combustion engine.

Advantageous Effects of Invention

According to the invention, such a heat resistant metal gasket is achieved that is easily processed due to the softness as a material for a metal gasket, and has excellent gas leak resistance. The material cost thereof is relatively inexpensive.

BRIEF DESCRIPTION OF DRAWINGS

FIG. 1 is an illustration schematically showing the shape and dimension of a gasket test piece.
FIG. 2 is an illustration schematically showing the state of the gasket test piece assembled to a restraining jig.

DESCRIPTION OF EMBODIMENTS

The ordinary evaluation methods of a metal gasket having a bead formed part include a settling resistance measuring test. In this test, such a test is performed that a metal gasket test piece is held between both opposite contact materials, which are pressed under application of a prescribed load, and is retained under the state in a prescribed environment, and then the change amount of the bead height before and after the test is measured. A smaller change amount means a larger resistance to deformation of the material, which is thus evaluated as a high strength material. The present inventors have verified the reasonableness of the evaluation method by the ordinary settling resistance test in such a manner that a gasket test piece having a bead formed part is produced by using various stainless steel sheet materials, and the test piece is actually assembled to a flat plate jig (in which both the opposite contact materials are in the form of flat plate), and measured for the gas leak amount after exposing to a temperature of from 600 to 800° C. As a result, it has been found that a high strength material receiving good evaluation in the settling resistance test is not necessarily excellent in gas leak resistance. For enhancing the gas leak resistance, it is important to consider other factors than the material strength.

Surface Roughness

In a steel sheet as a material for forming a gasket, it is important that the surface roughness is small. When the surface roughness of the material is large, the bent portion around the apex of the convex bead portion (which is hereinafter referred to as an "apical portion"), which is in contact with the opposite contact material, suffers large surface roughening when a bead is formed, and thereby it is difficult to ensure excellent sealing property. As a result of various investigations, in an austenitic stainless steel sheet having a thickness of 0.4 mm or less or 0.3 mm or less, the surface roughness Ra is necessarily 0.30 μm less, and more preferably 0.20 μm or less. The surface roughness of the material can be controlled mainly by the management of the material and the surface roughness of the work roll used for cold rolling.

Ordinary Temperature Hardness

An ordinary gasket material is an HT material, which exhibits a high strength (high elastic stress) on forming into a gasket, and therefore when the gasket is held between opposite contact materials under application of pressure, the stress applied to the gasket material (which is hereinafter referred to as a "surface pressure") is increased. As for a gasket that is used around ordinary temperature, it is considered that a larger surface pressure provides better sealing property. As for a heat resistant gasket, however, it has been found that the material thereof is largely deformed due to the high surface pressure on increasing the material temperature, and gas leakage occurs due to depression of the apical portion in an extreme case. That is, it has been found that the use of a material having an ordinary hardness that is not too large is effective for the enhancement of the gas leak resistance. Furthermore, the softness of the material may facilitate the formation of the gasket. As a result of detailed investigations, the invention targets a sheet material that is controlled to have a Vickers hardness at ordinary temperature of 430 HV or less. The hardness is more preferably 425 HV or less. For example, the hardness may be controlled to a range of from 190 to 430 HV, or from 190 to 425 HV. The hardness may be managed to a range of from 250 to 400 HV. The ordinary temperature hardness can be controlled mainly by the component composition of the alloy and the cold rolling reduction ratio.

Strain Index by X-ray Diffraction

A small processing strain accumulated in the austenite crystals is also effective for decreasing the surface pressure. Herein, the processing strain of the austenite crystals is evaluated by the half width of the peak of the (311) plane of the austenite crystals in the X-ray diffraction pattern. It has been found that the gas leak resistance is sharply decreased when the half width exceeds 1.60°. The half width is more preferably 1.57° or less. An annealed material without processing strain has a small half width and generally has a half width of 0.10° or more. The amount of strain in the austenite crystals can be controlled mainly by the cold rolling reduction ratio while the austenite stability depending on the chemical composition may also influence. The X-ray used herein is a Co—Kα ray.

High Temperature Hardness

The limitation of the ordinary temperature hardness to a low value is significantly effective for the enhancement of the gas leak resistance, as described above. However, a large decrease of the hardness at a high temperature may cause decrease of the surface pressure on heating to a high temperature. An excessive decrease of the surface pressure may be a factor of decreasing the gas leak resistance. As a result of various investigations, the difference ΔHV between the ordinary temperature hardness and the high temperature hardness at 700° C. is preferably 300 HV or less, and more preferably 250 HV or less. The difference ΔHV can be obtained by measuring the cross sectional hardness at ordinary temperature (for example, 20° C.) and 700° C. An annealed material generally has a small difference ΔHV, and the difference ΔHV thereof, which is the difference between the ordinary temperature hardness and the hardness at 700° C., is a value of 50 HV or more.

Chemical Composition

In the following description, "%" with respect to the chemical composition is "% by mass" unless otherwise indicated.

C is an alloy component that is effective for enhancing the high temperature strength, and strengthens a stainless steel through solid-solution strengthening and precipitation strengthening. The C content is necessarily 0.015% or more, and is more effectively 0.020% or more. Too large C content facilitates precipitation of a huge grain boundary carbide during the retention to a high temperature, which may be a factor of making the material brittle. The C content is restricted to 0.200% or less.

Si is a ferrite forming element, exhibits a large solid-solution strengthening function in an austenite phase, and accelerates age hardening through strain aging during the retention to a high temperature. These functions become conspicuous by ensuring a Si content of 1.50% or more. It is more effective to ensure a Si content exceeding 2.00%, and the Si content may be managed to a value exceeding 3.00%. An excessive Si content becomes a factor of inducing high temperature cracking. The Si content is restricted to 5.00% or less.

Mn is an austenite forming element, and can be a substitute of a part of expensive Ni. Mn also has a function of improving the hot workability through fixation of S. The Mn content is effectively 0.30% or more, and is more preferably 0.50% or more. A large Mn content becomes a factor of lowering the high temperature strength and the mechanical properties, and thus in the invention, the Mn content is restricted to 2.50% or less. The Mn content may be managed to less than 2.00%, or 1.50% or less.

Ni is an element that is necessary for providing a stable austenite structure, and in the invention, an Ni content of 7.0% or more is ensured. The Ni content is more preferably 11.0% or more. An excessive Ni content is uneconomical. In the invention, Ni is contained in a content in a range of 17.0% or less. The Ni content may be managed to a range of 15.0% or less.

Cr is an element that is necessary for enhancing the corrosion resistance and the oxidation resistance, and in consideration of the purpose of the metal gasket exposed to a severe high temperature corrosion environment, the Cr content is necessarily 13.0% or more. The Cr content more preferably exceeds 15.0%. An excessive Cr content facilitates the formation of a δ-ferrite phase and is disadvantageous for the retention of a stable austenite phase structure. The Cr content is restricted to 23.0% or less, and may be managed to 20.0% or less.

N is an element that is effective for increasing the high temperature strength of the austenitic stainless steel. The N content is desirably ensured to 0.005% or more. However, N that is excessively added is consumed for forming an $M_{23}X_6$ (wherein M represents Cr or the like, and X represents C, N or the like) precipitate, and does not lead the increase of the amount of solute N, which is effective for enhancing the high temperature strength. As a result of various investigations, the N content is restricted to 0.250% or less, and is more preferably 0.200% or less.

Mo is an element that is arbitrarily added, is effective for enhancing the corrosion resistance, and is finely dispersed as a carbonitride during the retention to a high temperature, so as to contribute to the enhancement of the high temperature strength. In the case where Mo is added, the content thereof is more effectively 0.01% or more, and further effectively 0.10% or more. However, a large Mo content leads the formation of a δ-ferrite phase, and thus the Mo content is restricted to 2.00% or less.

Cu is an element that is arbitrarily added, and forms a Cu precipitate that is different kind from the MX or $M_2X$ precipitates, associated with the temperature increase on use as a metal gasket, so as to contribute to the improvement of the high temperature strength and the softening resistance. In the case where Cu is added, the content thereof is effectively 0.01% or more, and is more effectively 0.10% or more. A large Cu content becomes a factor of decreasing the hot workability. The Cu content is restricted to 4.00% or less, and may be managed to a range of 2.00% or less.

Nb is an element that is arbitrarily added, and forms a precipitate, or is dissolved in the austenite matrix, under the high temperature environment, to which the metal gasket is exposed, so as to contribute to the increase of the hardness and the enhancement of the softening resistance. In the case where Nb is added, the content thereof is more effectively 0.01% or more, and further effectively 0.05% or more. An excessive Nb content decreases the hot workability due to decrease of the high temperature ductility. The Nb content is restricted to 0.80% or less, and may be managed to a range of 0.50% or less.

Ti is an element that is arbitrarily added, and forms a precipitate that is effective for enhancing the hardness and improving the settling resistance. In the case where Ti is added, the content thereof is more effectively 0.01% or more, and further effectively 0.05% or more. An excessive Ti content becomes a factor of forming surface defects. The Ti content is restricted to 0.50% or less.

V is an element that is arbitrarily added, and forms a precipitate that is effective for enhancing the hardness and improving the settling resistance. In the case where V is added, the content thereof is more effectively 0.01% or more, and further effectively 0.05% or more. An excessive V content becomes a factor of decreasing the workability and the toughness. The V content is restricted to 1.00% or less.

Zr is an element that is arbitrarily added, is effective for enhancing the high temperature strength, and has a function of enhancing the high temperature oxidation resistance with a slight amount thereof added. In the case where Zr is added, the content thereof is more effectively 0.01% or more, and further effectively 0.05% or more. An excessive Zr content causes σ-embrittlement to impair the toughness of the steel. The Zr content is restricted to 1.00% or less.

W is an element that is arbitrarily added, and is effective for enhancing the high temperature strength. In the case where W is added, the content thereof is more effectively 0.01% or more, and further effectively 1.00% or more. An excessive W content makes the steel too hard, and increases the material cost. The W content is restricted to 3.00% or less, and may be managed to a range of 2.00% or less.

Co is an element that is arbitrarily added, and is effective for enhancing the high temperature strength. In the case where Co is added, the content thereof is more effectively 0.01% or more, and further effectively 1.00% or more. An excessive W content makes the steel too hard, and increases the material cost. The W content is restricted to 3.00% or less.

B is an element that is arbitrarily added, accelerates the formation of a fine carbonitride precipitate, which is effective for increasing the high temperature strength, and exhibits a function of suppressing the grain boundary segregation of S and the like to prevent edge cracks from being formed in the hot rolling temperature range. In the case where B is added, the content thereof is effectively 0.001% or more, and further effectively 0.005% or more. The addition of B in an excessive amount facilitates the formation of a low melting point borate, which becomes a factor of deteriorating the hot workability. The B content is restricted to 0.020% or less.

Al is an element that is arbitrarily added, functions as a deoxidizing agent in the steel making, and has a large effect of decreasing the A2 inclusion, which adversely affects the punching property on punching the steel sheet into a gasket shape. In the case where Al is added, the adding amount is effectively controlled so that the content thereof is 0.001% or more, and further effectively 0.005% or more. Even though Al is added in an excessive amount, the aforementioned effects are saturated, and a factor of increasing surface defects occurs. The Al content is restricted to 0.20% or less.

REM (i.e., rare-earth element except for Y), Y, Ca, and Mg are elements that are arbitrarily added, and are all effective for improving the hot workability and the oxidation resistance. In the case where at least one kind thereof is added, the content of each of them is effectively 0.001% or more. Even though these elements are added in an excessive amount, the aforementioned effects are saturated. REM (i.e., rare-earth element except for Y) maybe added in a content range of 0.20% or less, Y may be added in a content range of 0.20% or less, Ca may be added in a content range of 0.10% or less, and Mg may be added in a content range of 0.10% or less.

EXAMPLE

The steels having the chemical compositions shown in Table 1 were melted in a 300 kg vacuum melting furnace, and annealed steel sheets were produced through steps of hot forging, hot rolling, annealing, pickling, cold rolling, annealing, and pickling. The annealed steel sheets except for some species each were further subjected to cold rolling to provide test steel sheets having a thickness of from 0.15 to 0.30 mm. The rolling reduction ratios of the final cold rolling are shown in Table 2.

the center thereof, and a bead having a width of 3 mm and a height of 0.5 mm was formed on the outer periphery of the opening by press forming, thereby providing a metal gasket test piece. FIG. 1 schematically shows the shape of the test

TABLE 1

| Class | No. | Chemical composition (% by mass) | | | | | | | |
|---|---|---|---|---|---|---|---|---|---|
| | | C | Si | Mn | Ni | Cr | N | Mo | Cu |
| Example of Invention | 1 | 0.038 | 4.67 | 0.80 | 15.22 | 18.68 | 0.049 | — | 1.47 |
| | 2 | 0.022 | 1.62 | 0.78 | 12.50 | 18.46 | 0.021 | 1.75 | — |
| | 3 | 0.037 | 2.48 | 0.77 | 12.59 | 19.13 | 0.033 | — | — |
| | 4 | 0.039 | 2.89 | 1.18 | 10.39 | 18.48 | 0.024 | — | — |
| | 5 | 0.021 | 2.55 | 1.50 | 9.48 | 17.74 | 0.191 | — | — |
| | 6 | 0.029 | 2.13 | 0.82 | 12.97 | 19.21 | 0.016 | — | — |
| | 7 | 0.020 | 3.06 | 0.79 | 13.15 | 18.87 | 0.020 | 0.51 | — |
| | 8 | 0.029 | 2.61 | 1.09 | 16.43 | 22.48 | 0.012 | — | — |
| | 9 | 0.028 | 3.27 | 2.33 | 14.45 | 20.63 | 0.065 | — | — |
| | 10 | 0.036 | 3.62 | 0.75 | 7.52 | 13.91 | 0.009 | — | — |
| | 11 | 0.035 | 3.15 | 0.71 | 13.03 | 18.97 | 0.133 | — | — |
| | 12 | 0.061 | 1.68 | 1.07 | 10.89 | 19.95 | 0.145 | — | — |
| Comparative Example | 21 | 0.061 | 1.68 | 1.07 | 10.89 | 19.95 | 0.145 | — | — |
| | 22 | 0.061 | 1.68 | 1.07 | 10.89 | 19.95 | 0.145 | — | — |
| | 23 | 0.047 | 3.27 | 0.80 | 13.15 | 19.02 | 0.021 | — | — |
| | 24 | 0.062 | 0.55 | 0.31 | 2.02 | 16.25 | 0.108 | 0.07 | 0.23 |
| | 25 | 0.023 | 0.53 | 1.20 | 7.21 | 17.53 | 0.103 | 0.10 | 0.21 |
| | 26 | 0.021 | 0.17 | 5.98 | 10.04 | 23.43 | 0.480 | 2.03 | — |
| | 27 | 0.061 | 0.43 | 14.62 | 1.22 | 17.19 | 0.420 | — | — |
| | 28 | 0.108 | 0.44 | 0.36 | 0.13 | 12.37 | 0.015 | 0.05 | — |

| Class | No. | Chemical composition (% by mass) | | | | | | | |
|---|---|---|---|---|---|---|---|---|---|
| | | Nb | Ti | V | Zr | W | Co | B | others |
| Example of Invention | 1 | — | — | — | — | — | — | | Y: 0.11 |
| | 2 | — | — | — | — | — | — | | Al: 0.09 |
| | 3 | 0.77 | — | — | — | — | — | | Mg: 0.03, Ca: 0.03 |
| | 4 | 0.20 | 0.09 | — | — | — | — | | Al: 0.13 |
| | 5 | — | — | — | 0.51 | — | — | | REM: 0.04 |
| | 6 | — | 0.40 | — | — | — | — | | Al: 0.09, REM: 0.03 |
| | 7 | — | — | 0.25 | — | — | — | | Al: 0.03 |
| | 8 | — | — | — | — | 1.55 | — | | Al: 0.02 |
| | 9 | — | — | 0.76 | — | — | — | 0.014 | REM: 0.07 |
| | 10 | — | — | — | — | — | 2.06 | | Y: 0.03 |
| | 11 | — | — | — | — | — | — | | |
| | 12 | 0.12 | — | — | — | — | — | | REM: 0.04, Ca: 0.005 |
| Comparative Example | 21 | 0.12 | — | — | — | — | — | | REM: 0.04, Ca: 0.005 |
| | 22 | 0.12 | — | — | — | — | — | | REM: 0.04, Ca: 0.005 |
| | 23 | 0.10 | — | — | — | — | — | | Al: 0.01 |
| | 24 | — | — | — | — | — | — | 0.010 | Al: 0.02 |
| | 25 | — | — | — | — | — | — | | Al: 0.03 |
| | 26 | — | — | — | — | — | — | | Al: 0.02 |
| | 27 | — | — | — | — | — | — | | Al: 0.02 |
| | 28 | — | — | — | — | — | — | | — |

Underlined values: outside the scope of the invention

The test steel sheets each were measured for the X-ray diffraction pattern of the surface perpendicular to the thickness direction under condition of a Co tube, 40 kV, and 200 mA, and the half width of the peak of the austenite crystal (311) plane was obtained. The test steel sheets each were also measured for the surface roughness and the hardness at ordinary temperature. The test steel sheets each were measured for the ordinary temperature hardness and the hardness at 700° C. of the cross section thereof, and the difference ΔHV in Vickers hardness was obtained.

Gas Leak Resistance Test

A circular test piece having a diameter of 50 mm was collected from each of the test steel sheets, a circular opening having an inner diameter of 32 mm was formed at the center thereof, and a bead having a width of 3 mm and a height of 0.5 mm was formed on the outer periphery of the opening by press forming, thereby providing a metal gasket test piece. FIG. 1 schematically shows the shape of the test piece. The right figure in FIG. 1 shows the cross sectional shape of the circular gasket test piece on the cross section including the circle center of the test piece in parallel to the thickness direction thereof (only one side with respect to the circle center is shown). The metal gasket test piece was assembled to a restraining jig formed of steel. FIG. 2 schematically shows the state of the cross section of the gasket test piece assembled to the restraining jig. The restriction jig as the opposite contact material of the metal gasket had a flat contact surface. In FIG. 2, the fastening bolts and nuts are shown as an outer appearance for description purpose. The restriction jig having the test piece assembled thereto was retained to 800° C. for 100 hours, and then slowly cooled to room temperature. After slowly cooling, nitrogen gas was introduced to the space surrounded by the gasket and the restriction jig (i.e., the upper and lower opposite contact materials) under a pressure of 0.1 MPa through a gas introducing tube attached to only one of the opposite contact materials of the restriction jig, and the flow rate of the gas leaked outside from the space was measured. In this test, it can be determined that the gasket has excellent sealing capability as a heat resistant gasket when the flow rate of the leaked gas is 100 cm$^3$/min or less.

Oxidation Resistance Test

A test piece having a dimension of 25 mm×35 mm was collected from the test steel sheet, dry-polished with emery polishing paper with the final grit #400, and then subjected to 2,000 cycles of an oxidation resistance test by repeating heating in an electric furnace to 600 to 800° C. for 5 minutes and cooling in the air for 5 minutes. The weights of the test piece before subjecting to the test and after completing the 2,000 cycles were compared to each other, and the test piece exhibiting a weight change of 10 mg/cm$^2$ or less was evaluated as ○ (good oxidation resistance), whereas the test piece exhibiting a weight change exceeding 10 mg/cm$^2$ was designated as × (poor oxidation resistance). The test piece that is evaluated as ○ in this test determined to have practical oxidation resistance as a metal gasket used at a temperature of from 600 to 800° C.

Corrosion Resistance Test

For evaluating the corrosion resistance to condensed water of an exhaust gas, i.e., the sensitization characteristics, a corrosion resistance test was performed according to JIS G0575 (method of copper sulfate-sulfuric acid test for stainless steels), and the test piece suffering no work cracking was evaluated as ○ (good corrosion resistance), whereas the test piece suffering work cracking was designated as × (poor corrosion resistance).

The results are shown in Table 2.

austenite crystals due to the high cold rolling reduction ratio, had a high ordinary temperature hardness, and was inferior in gas leak resistance. Comparative Example No. 22 was also formed of the same steel as the Example No. 12 of the invention, but was inferior in gas leak resistance due to the large surface roughness. Comparative Example No. 23 had the chemical composition within the scope of the invention, but exhibited a large amount of strain in the austenite crystals due to the high cold rolling reduction, and was inferior in gas leak resistance. Comparative Examples Nos. 24 to 28 each had a chemical composition outside the scope of the invention, and failed to provide good gas leak resistance.

The invention claimed is:

1. An austenitic stainless steel sheet for a metal gasket, having a chemical composition containing from 0.015 to 0.200 % of C, from 1.50 to 5.00% of Si, from 0.30 to 2.50% of Mn, from 7.0 to 17.0% of Ni, from 13.0 to 23.0% of Cr, and from 0.005 to 0.250% of N, all in terms of percentage by mass, with the balance of Fe and unavoidable impurities, having an ordinary temperature hardness of 430 HV or less, having a half width of a peak of an austenite crystal (311) plane in an X-ray diffraction pattern of a cross section perpendicular to a sheet thickness direction of from 0.60 to 1.60°, and having a surface roughness Ra of 0.30 μm or less.

2. The austenitic stainless steel sheet for a metal gasket according to claim 1, wherein the austenitic stainless steel sheet has a chemical composition further containing at least one of 2.00% or less of Mo, 4.00% or less of Cu, 0.80% or less of Nb, 0.50% or less of Ti, 1.00% or less of V, 1.00% or less of Zr, 3.00% or less of W, 3.00% or less of Co, and 0.020% or less of B, all in terms of percentage by mass.

3. The austenitic stainless steel sheet for a metal gasket according to claim 1, wherein the austenitic stainless steel sheet has a chemical composition further containing at least

TABLE 2

| Class | No. | Cold rolling reduction (%) | γ (311) half width (°) | Surface roughness Ra (μm) | Ordinary temperature hardness (HV) | ΔHV (HV) | Gas leak resistance (cm$^3$/min) | Evaluation of oxidation resistance | Evaluation of corrosion resistance |
|---|---|---|---|---|---|---|---|---|---|
| Example of Invention | 1 | 50 | 1.25 | 0.08 | 375 | 200 | 50 | ○ | ○ |
| | 2 | 0 | 0.60 | 0.18 | 200 | 60 | 20 | ○ | ○ |
| | 3 | 20 | 1.12 | 0.10 | 330 | 180 | 40 | ○ | ○ |
| | 4 | 45 | 1.37 | 0.11 | 395 | 225 | 80 | ○ | ○ |
| | 5 | 50 | 1.25 | 0.09 | 375 | 185 | 45 | ○ | ○ |
| | 6 | 40 | 1.55 | 0.17 | 420 | 255 | 95 | ○ | ○ |
| | 7 | 45 | 1.35 | 0.07 | 390 | 230 | 90 | ○ | ○ |
| | 8 | 40 | 1.48 | 0.16 | 410 | 225 | 85 | ○ | ○ |
| | 9 | 50 | 1.30 | 0.13 | 385 | 215 | 75 | ○ | ○ |
| | 10 | 50 | 1.27 | 0.13 | 380 | 220 | 75 | ○ | ○ |
| | 11 | 50 | 1.28 | 0.11 | 380 | 200 | 50 | ○ | ○ |
| | 12 | 40 | 1.32 | 0.18 | 390 | 205 | 70 | ○ | ○ |
| Comparative Example | 21 | 60 | <u>1.64</u> | 0.07 | <u>435</u> | 235 | 910 | ○ | ○ |
| | 22 | 40 | 1.32 | <u>0.32</u> | 390 | 205 | 530 | ○ | ○ |
| | 23 | 60 | <u>1.69</u> | 0.06 | 390 | 215 | 1420 | ○ | ○ |
| | 24 | 15 | — | 0.28 | 375 | 330 | 790 | × | × |
| | 25 | 50 | <u>1.75</u> | 0.08 | <u>460</u> | 340 | 550 | × | × |
| | 26 | 60 | <u>1.71</u> | 0.07 | <u>480</u> | 280 | 180 | ○ | ○ |
| | 27 | 40 | <u>1.65</u> | 0.12 | <u>450</u> | 245 | 360 | × | ○ |
| | 28 | 0 | — | 0.19 | <u>445</u> | 380 | 1070 | ○ | × |

Underlined values: outside the scope of the invention

Examples of the invention were all excellent in gas leak resistance, and good in oxidation resistance and corrosion resistance.

On the other hand, Comparative Example No. 21 was formed of the same steel as the Example No. 12 of the invention, but exhibited a large amount of strain in the one of 0.20% or less of Al, 0.20% or less of REM (i.e., rare-earth element except for Y), 0.20% or less of Y, 0.10% or less of Ca, and 0.10% or less of Mg, all in terms of percentage by mass.

4. The austenitic stainless steel sheet for a metal gasket according to claim 1, wherein the austenitic stainless steel sheet has a difference ΔHV between an ordinary temperature hardness and a high temperature hardness at 700° C. of 300 HV or less.

5. The austenitic stainless steel sheet for a metal gasket according to claim 1, wherein the austenitic stainless steel sheet has a sheet thickness of from 0.10 to 0.40 mm.

6. A metal gasket comprising the austenitic stainless steel sheet for a metal gasket according to claim 1 having been formed, the metal gasket having a bead formed by press forming, and being used by pressing an apex of the bead onto an opposite contact material.

7. The metal gasket according to claim 6, wherein the metal gasket is used at a temperature of from 600 to 800° C.

8. The metal gasket according to claim 6, wherein the metal gasket is used for sealing a combustion gas of an internal combustion engine.

\* \* \* \* \*